US010232770B2

United States Patent
LeCompte et al.

(10) Patent No.: US 10,232,770 B2
(45) Date of Patent: Mar. 19, 2019

(54) ILLUMINATED MARKER (71) Applicant: YKK Corporation of America, Marietta, GA (US)

(72) Inventors: Chuck G. LeCompte, Lawrenceburg, KY (US); Garland Jesse Brock, Lawrenceburg, KY (US); Jonathan Hampton Sharp, Lawrenceburg, KY (US)

(73) Assignee: YKK Corporation of America, Marietta, GA (US)

( * ) Notice: Subject to any disclaimer, the term of this patent is extended or adjusted under 35 U.S.C. 154(b) by 371 days.

(21) Appl. No.: 14/847,118

(22) Filed: Sep. 8, 2015

(65) Prior Publication Data

US 2017/0066373 A1    Mar. 9, 2017

(51) Int. Cl.
*B60N 2/00*    (2006.01)
*B60Q 3/14*    (2017.01)
*B60Q 3/20*    (2017.01)
*B60Q 3/76*    (2017.01)
*B60K 35/00*    (2006.01)

(52) U.S. Cl.
CPC .............. *B60Q 3/76* (2017.02); *B60K 35/00* (2013.01); *B60N 2/00* (2013.01); *B60Q 3/14* (2017.02); *B60Q 3/20* (2017.02)

(58) Field of Classification Search
CPC .......... B60Q 3/233; B60Q 3/242; B60Q 3/64; A41D 13/01; A41D 27/085; A41D 19/0157; F21V 33/0008; F21V 19/004; F21W 2121/06
USPC .......................... 362/570, 571, 565, 103, 104
See application file for complete search history.

(56) References Cited

U.S. PATENT DOCUMENTS 4,364,107 A * 12/1982 Wieczorek ............. A61B 3/024
                                                          362/285
4,712,163 A * 12/1987 Oxley ........................ F21S 8/00
                                                         362/23.01
(Continued)

FOREIGN PATENT DOCUMENTS

GB    1530304 A  * 10/1978    ............ F21V 31/005
GB    2040670 A  *  9/1980    ............ A41D 13/01
(Continued)

OTHER PUBLICATIONS car-safety.org; Article entitled "Latch", located at <http://www.car-safety.org/carseat-vehicle-latch-system/>, accessed on Aug. 24, 2015, 7 pgs.
(Continued)

*Primary Examiner* — Alexander K Garlen
*Assistant Examiner* — Colin J Cattanach
(74) *Attorney, Agent, or Firm* — Taylor English Duma LLP (57) ABSTRACT

Disclosed is an illuminated marker device including: an inner surface; an outer surface, the outer surface including a first portion and a second portion, the first portion being translucent; and a post, the post extending from the inner surface away from the outer surface. Also disclosed is an illuminated marker device including: an inner surface; an outer surface, the outer surface including a graphics portion and a background portion, a one of the graphics portion and the background portion including a photoluminescent material; and a post, the post extending from the inner surface away from the outer surface.

19 Claims, 6 Drawing Sheets

(56) References Cited

U.S. PATENT DOCUMENTS

| | | | | |
|---|---|---|---|---|
| 4,829,407 A * | 5/1989 | Bushell | | F21V 9/00 362/23.01 |
| 4,977,695 A * | 12/1990 | Armbruster | | B60R 13/005 40/541 |
| 5,066,889 A * | 11/1991 | Edwards | | F21K 9/00 313/499 |
| 5,440,468 A * | 8/1995 | Savage, Jr. | | F21V 3/00 248/27.3 |
| 5,775,721 A * | 7/1998 | Grout | | B60R 21/215 280/727 |
| 5,811,174 A * | 9/1998 | Murakami | | C09K 11/02 250/484.4 |
| 5,813,148 A * | 9/1998 | Guerra | | A43B 1/0036 36/137 |
| 5,818,995 A * | 10/1998 | Savage, Jr. | | G02B 6/32 385/33 |
| 5,848,839 A * | 12/1998 | Savage, Jr. | | F21V 31/005 257/E33.059 |
| 5,933,929 A * | 8/1999 | Kawakami | | A44B 17/0035 24/324 |
| 6,027,227 A * | 2/2000 | Tung | | B60Q 7/00 362/103 |
| 6,036,326 A * | 3/2000 | Yoshikawa | | H01H 13/83 200/310 |
| 6,174,075 B1 | 1/2001 | Fuwausa | | |
| 6,581,311 B1 * | 6/2003 | Davey | | B60R 13/005 296/214 |
| 6,666,689 B1 * | 12/2003 | Savage, Jr. | | H01R 13/717 362/378 |
| 7,727,009 B2 * | 6/2010 | Goto | | F21V 5/04 362/396 |
| 7,857,484 B2 * | 12/2010 | Marshall | | F21K 9/00 362/249.01 |
| 8,308,328 B2 * | 11/2012 | Fujimura | | G06F 1/1613 362/551 |
| 8,459,713 B2 | 6/2013 | Sella | | B60R 21/215 280/728.3 |
| 8,590,185 B1 * | 11/2013 | Jardine | | G09F 21/02 24/104 |
| 2003/0133302 A1 * | 7/2003 | Kamiya | | H05K 3/202 361/715 |
| 2003/0202337 A1 * | 10/2003 | Yin | | H01H 9/185 362/23.03 |
| 2004/0136175 A1 * | 7/2004 | Lewis | | A44C 3/001 362/84 |
| 2005/0068189 A9 * | 3/2005 | Nishizawa | | G08B 5/36 340/815.42 |
| 2006/0221626 A1 * | 10/2006 | Kamiya | | B60Q 3/64 362/514 |
| 2007/0041218 A1 * | 2/2007 | Kuo | | G02B 6/0001 362/634 |
| 2009/0059610 A1 * | 3/2009 | Marshall | | F21K 9/00 362/470 |
| 2009/0129100 A1 * | 5/2009 | Goto | | F21V 21/04 362/368 |
| 2010/0084959 A1 * | 4/2010 | Nam | | F21V 17/12 313/116 |
| 2010/0107806 A1 * | 5/2010 | Corinaldi | | B62D 1/046 74/552 |
| 2010/0165622 A1 * | 7/2010 | Geudner | | B60Q 3/54 362/235 |
| 2010/0296302 A1 * | 11/2010 | Welch, Sr. | | B60R 13/00 362/471 |
| 2012/0160642 A1 * | 6/2012 | Liao | | H01H 13/023 200/310 |
| 2012/0320615 A1 * | 12/2012 | Englert | | B60Q 1/323 362/511 |
| 2013/0062867 A1 * | 3/2013 | Schmitz | | B60R 13/0243 280/734 |
| 2014/0017512 A1 * | 1/2014 | Iimori | | C25D 5/10 428/652 |
| 2016/0161105 A1 * | 6/2016 | Cheng | | F21V 33/00 362/23.05 |
| 2016/0176367 A1 * | 6/2016 | Stossel | | B60R 13/02 362/509 |
| 2016/0377796 A1 * | 12/2016 | Sherman | | G02B 6/0065 40/541 |

FOREIGN PATENT DOCUMENTS

| | | |
|---|---|---|
| JP | 2000118320 | 4/2000 |
| JP | 2006160136 | 6/2006 |
| JP | 2006193096 | 7/2006 |
| JP | 2009137528 | 6/2009 |
| JP | 4580224 | 9/2010 |

OTHER PUBLICATIONS

YKK; Article entitled "ISO Marker Button", located at <http://ykkamerica.comauto/ISO/htm>, accessed on Mar. 20, 2015, 1 pg.

* cited by examiner

ILLUMINATED MARKER

TECHNICAL FIELD

This disclosure relates to marking devices. More specifically, this disclosure relates to illuminated markers on or in a vehicle.

BACKGROUND

Some vehicles incorporate various features for the improved comfort, safety, or convenience of their owners, users, drivers, or passengers. In a road vehicle such as a passenger automobile, governmental regulations or industry practice may require manufacturers to identify the location and proper use of one or more of these features. Manufacturers also may wish to identify features of the vehicle to users. Under certain conditions, the location of such features may still be unclear to an owner, user, driver, or passenger of the vehicle. These situations may include, but are not limited to, use of the vehicle at night, use of the vehicle in inclement weather, and use of the vehicle under cover (such as in a garage or covered parking lot) where visibility is poor or less than ideal. When lighting and general visibility is poor, an owner, user, driver, or passenger of a vehicle may not be able to locate the feature. In the case of features related to safety, such as child seat attachment mechanisms, the user may therefore not be able to take advantage of the feature to properly protect himself or herself or other passengers in the vehicle.

SUMMARY

Disclosed is an illuminated marker device including: an inner surface; an outer surface, the outer surface including a first portion and a second portion, the first portion being translucent; and a post, the post extending from the inner surface away from the outer surface.

Also disclosed is an illuminated marker device including: an inner surface; an outer surface, the outer surface including a graphics portion and a background portion, a one of the graphics portion and the background portion including a photoluminescent material; and a post, the post extending from the inner surface away from the outer surface.

Also disclosed is a method of installing an illuminated marker device on a vehicle, the method including: aligning a post of the marker device with a washer of the marker device, the post extending from an inner surface of the marker device away from an outer surface of the marker device; inserting the post into the washer; and securing the post to the washer.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed are both non-illuminated and illuminated markers and associated methods, systems, devices, and various apparatus. In various embodiments, the illuminated marker includes an inner surface and an outer surface and a post. It would be understood by one of skill in the art that the disclosed illuminated marker is described in but a few exemplary embodiments among many. No particular terminology or description should be considered limiting on the disclosure or the scope of any claims issuing therefrom.

Figure 1:
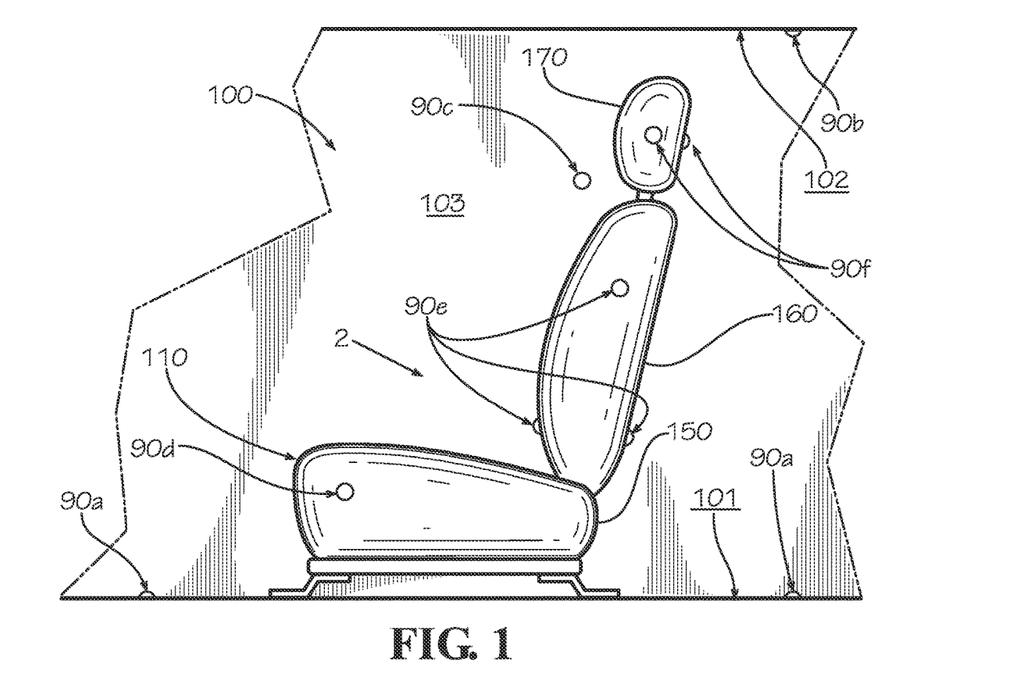
FIG. 1 is a side view of an inside of a passenger vehicle including a floor, a ceiling, a wall, and a seat.

FIG. 1 discloses one embodiment of a system incorporating a plurality of illuminated markers 90, which can include a variety of illuminated markers 400,600,800,900, 1000,1100 (shown in FIGS. 3-11). In various embodiments, an interior 100 of a vehicle includes a floor surface 101, a ceiling surface 102, and a wall surface 103. Attached to the floor surface 101 of the interior 100 is a seat 110, the seat 110 including a seat bottom 150—sometimes referred to as a seat cushion—as well as a seat back 160 and a headrest 170. Each of the components of the seat 110 include multiple surfaces on the front, back, top, bottom, and sides of each.

While not exhaustive, illuminated markers 90 can be mounted in a plurality of mounting locations as shown. The illuminated markers 90a are shown mounted in the floor surface 101 in front of or behind the seat 110. The illuminated marker 90b is shown mounted in the ceiling surface 102 in any one of a number of locations above the seat 110. The illuminated marker 90c is shown mounted in the wall surface 103 in any one of a number of locations on either side of the seat 110. The illuminated marker 90d is shown mounted on a surface—such as a side surface—of the seat bottom 150 of the seat 110. Each of the illuminated markers 90e is shown mounted on a surface—such as a front, rear, or side surface—of the seat back 160 of the seat 110. Each of the illuminated markers 90f is shown mounted on a surface—such as a side or rear surface—of the headrest 170 of the seat 110. Other mounting locations (not shown) for an illuminated marker 90 in the interior 100 a vehicle include, but are not limited to, a dashboard surface, a center console surface at any one of various locations in the vehicle, a rear shelf surface, a cargo area surface, a headliner surface whether part of any of the aforementioned surfaces, a surface within or on a glove compartment, and any accessory control surface.

Specific features—including safety features—of an interior 100 of a vehicle able to be identified, controlled, or otherwise marked with an illuminated marker 90 include, but are not limited to, the airbags—including side airbags—constituting part of a supplemental-restraint system inside a vehicle; the individual components of a restraint system such as seat belts inside a vehicle; the child safety seat attachment system; radio controls; climate or temperature controls; seat adjustment controls (including controls for adjustment of the seat bottom 150, the seat back 160, or the headrest 170); interior and exterior light controls; video or music player controls, inputs, or outputs; food or drink containers (whether refrigerated or not); and any one of a number of interior controls for various other vehicle accessories.

The disclosure of the interior 100 of a vehicle, however, should not be considered limiting on the current disclosure, as illuminated markers 90 can be employed in other locations on a vehicle including, but not limited to, any one of a number of different locations on the exterior of the vehicle, an engine compartment of a vehicle, and a storage trunk. Specific features not necessarily located in the interior 100 vehicle that can be identified, controlled, or otherwise marked with an illuminated marker 90 include, but are not limited to, an exterior handle or latch, a license plate, a running board, an exterior side panel, an underbody panel, a side mirror, a key entry or lock, and a roof rack. In the engine compartment or other mechanical compartment of a vehicle, features that can be identified, controlled, or otherwise marked with an illuminated marker 90 include, but are not limited to, a dipstick for checking various fluid levels, caps for checking and/or replenishing various fluid levels, and any one of a number of other mechanical or structural parts and accessories. Features located on the exterior of a vehicle can be just as important to locate, understand, and properly use as the features inside the interior 100 of a vehicle. Moreover, to facilitate the installation and use of an illuminated marker 90 in various locations of the vehicle, it may be beneficial to incorporate any one or more of a variety of gaskets, O-rings, or other types of seals to protect the area inside and around the illuminated marker 90 from the elements.

The proportions of FIG. 1—not drawn to scale—approximately reflect those of the interior 100 of a vehicle for travel on roads. Other vehicles are also able to use an illuminated marker 90 including, but not limited to, both commercial and non-commercial transportation; various types of road, rail, air, and sea transportation including, but not limited to airplanes, helicopters, boats, and ships; and public and private transportation. In various embodiments, an illuminated marker 90 can be used on an object other than a vehicle and the disclosure of a vehicle should not be considered limiting.

A vehicle owner's manual often includes information about the location and proper use of safety-related and various other features. The aforementioned child safety seat attachment system is a common part of such a manual. The feature itself, if identified at all on or in the vehicle itself, may be marked with a non-descript marker that, at best, identifies the location of the feature in ideal conditions. In various embodiments, the illuminated marker 90 can clearly specify the location of a feature in a number of both ideal and non-ideal conditions. In various embodiments, the illuminated marker 90 can also specify the operational status, purpose, or proper use of one or more components of one or more features or systems.

Even conscientious users of a particular feature such as a child safety seat attachment system cannot always read or otherwise access and retain all of the information contained in the owner's manuals of a vehicle—particularly if they are borrowing, renting, sharing, or purchasing the vehicle used. While not limited to users in this category, a more intuitive and graphical method of communication, especially a method that functions even in poor light or poor visibility, can increase the likelihood that a particular feature is not only used but also used properly.

Examples of child safety seat attachment systems include the ISOFIX system used in most, if not all, of Europe, Japan, and the United States. The ISOFIX system is commonly referred to as the LATCH system in the United States (where the acronym LATCH stands for "Lower Anchors and Tethers for CHildren"), the UAS system in Canada (where the acronym UAS stands for "Universal Anchorage System"), and sometimes the Universal Child Safety Seat System or UCSSS. Manufacturers of car seats may in some instances refer to this system and similar systems and in some instances use their own or other terms. In the embodiments of the illuminated marker 90 disclosed herein, logos, pictograms, or symbols of the ISOFIX system or other systems are disclosed. The disclosure of an ISOFIX or any other logo should not be considered limiting, as any pictogram, logo, or graphic can be used in an illuminated marker 90.

Figure 2:
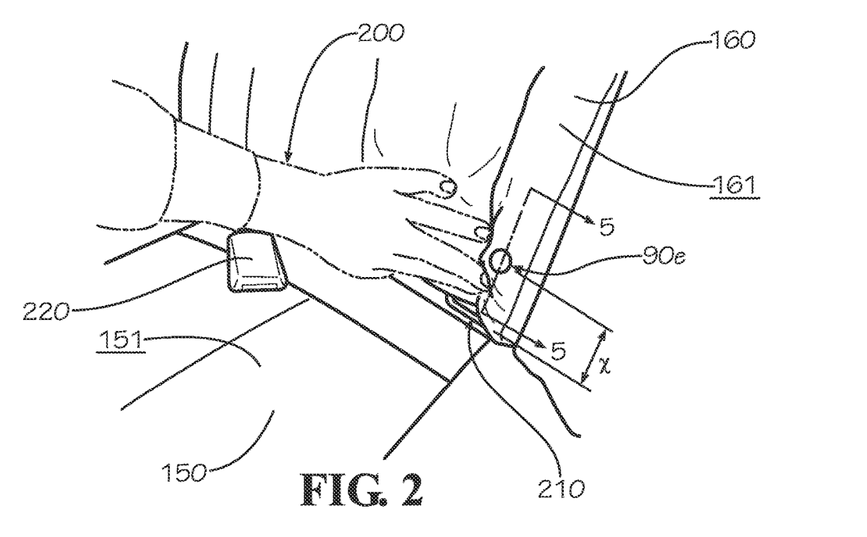
FIG. 2 is a perspective detail view of a seat taken from view 2 of FIG. 1 incorporating a child-safety seat attachment device and an identification marker therefor.

One advantage of the ISOFIX and similar systems is that, a user is able to more easily ensure a child safety seat is properly installed in the interior of a vehicle such as the interior 100 disclosed. As disclosed in FIG. 2, however, sometimes for both aesthetic and functional reasons, an anchor 210 commonly included in many implementations of the ISOFIX system is located at the intersection of the seat bottom 150 and the seat back 160 and is often hidden from view. It is sometimes only when a user 200 pulls away or pushes aside a surface 161 of the seat back 160 or a surface 151 of seat bottom 150 that the anchor 210 becomes visible. Because the anchor 210 is often hidden or otherwise obscured, the location of anchor 210 may be identified by placing a non-illuminated marker 300 in the location where the previously undisclosed illuminated marker 90e is shown in FIG. 2, separated from the anchor 210 by a distance x. Even though a buckle 220 is more frequently visible from a distance without the necessity for searching, the buckle 220 can also become hidden by the adjustment, deployment, or movement of one seat 110 relative to another seat 110 or relative to another part of the vehicle or due to the users pushing the buckle 220 into a gap between one seat 110 and another or between the seat bottom 150 and the seat back 160 in various embodiments. For at least these reasons, various embodiments of the interior 100 may include identifying the location of the buckle 220 with a marker, which in some embodiments may be a non-illuminated marker 300 or the illuminated marker 90. The disclosure of the anchor 210 and the buckle 220 as items that can be marked with a marker such as the non-illuminated marker 300 or the illuminated marker 90, however, should not be considered limiting on the current disclosure. One aspect of the present disclosure includes locating a marker such as the illuminated marker 90 in close proximity to any vehicle feature that is at least partially obscured or otherwise difficult to locate, without regard to any specific structural or functional aspects of the marker.

Figures 3, 4:
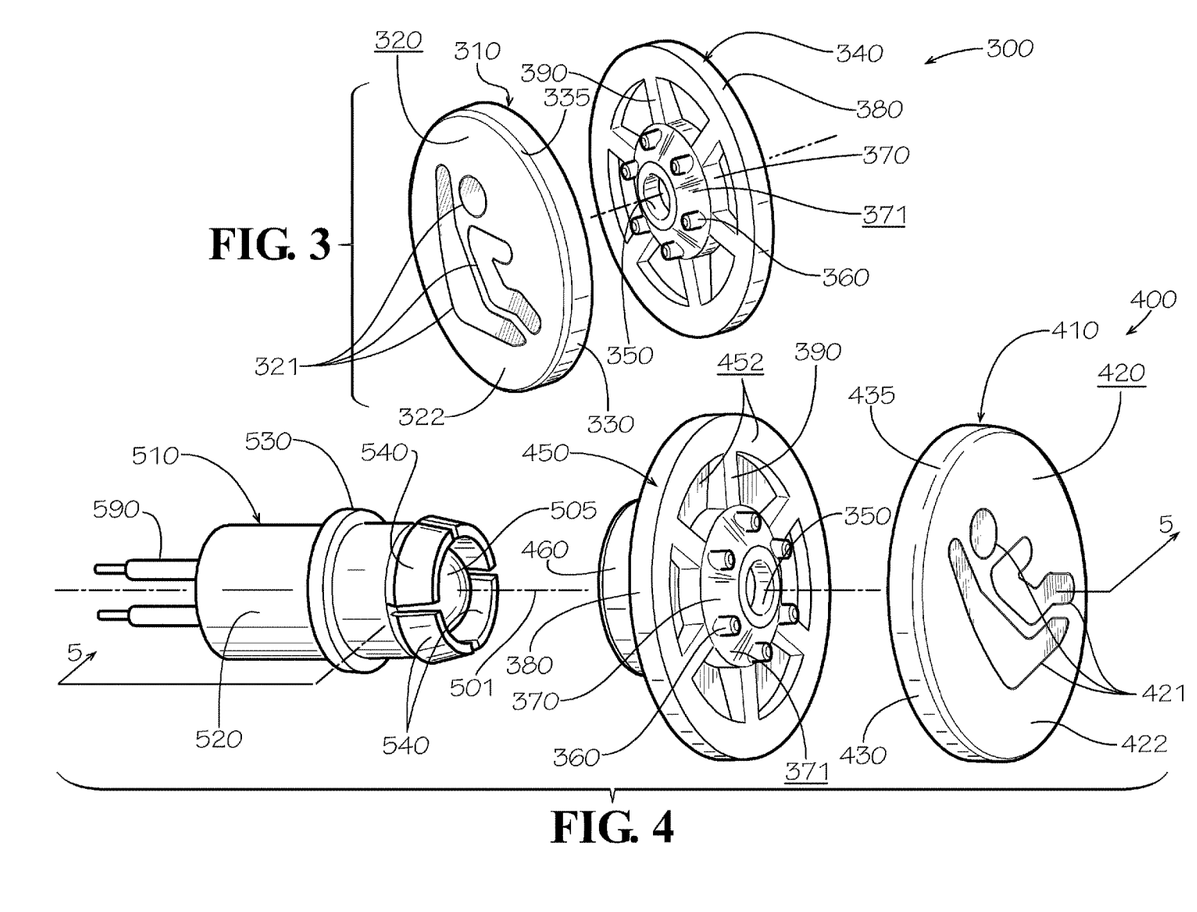
FIG. 3 is an exploded perspective view of a non-illuminated marker.
FIG. 4 is an exploded perspective view of one embodiment of an illuminated marker including an electrically powered light source.

One embodiment of the non-illuminated marker 300 is disclosed and described in FIG. 3. The non-illuminated marker 300 includes a button 310 and a washer 340. The button 310 defines an inner surface (not shown) facing the washer 340 and an outer surface 320 and includes a rim 330, an edge treatment 335, and a post (not shown). The outer surface 320 of the button 310 includes a first portion 321 and a second portion 322. In various embodiments, the first portion 321 defines a specific logo, symbol, text, or other graphical element by having a material type, finish, or color that differs from that of the second portion 322. The first portion 321 can have a smooth, glossy finish, for example, while the second portion 322 has a rough, matte finish. In various embodiments, the first portion 321 is formed from a material having one color—white, for example—while the second portion 322 is formed from a material having another color—black, for example. In various embodiments, a material having a darker color such as black is used to form the first portion 321 while a material having a lighter color such as white is used to form the second portion 322.

In various embodiments, the diameter of the button 310 and any of the other illuminated variations disclosed herein is between 13 mm and 19 mm. In various embodiments, the diameter of the button 310 and any of the other illuminated variations disclosed herein is approximately 15 mm ("line 24" or "24-line" size in the industry) or approximately 19 mm ("line 30" or "30-line" size). However, the disclosure of a specific diameter should not be considered limiting. In various embodiments, the illuminated marker 90 is not circular as shown in the figures and instead includes any number of other shapes including, but not limited to, oval, elliptical, and polygonal, with or without symmetry along any axis. While the outer surface 320 is shown as substantially flat in cross-section in the current embodiments, in variations of the embodiments disclosed herein the outer surface may be curved, domed, or concave in cross-section, among other shapes.

In the various embodiments disclosed herein, the material forming the button 310 and any of the other illuminated variations disclosed herein is a polymeric material due to the desirable material properties often associated therewith including, but not limited to, a polymeric material's strength-to-weight ratio, abrasion resistance, hardness, cost, appearance, manufacturability, ease of introducing various colors and finishes, ability to achieve tight tolerances, temperature stability, and corrosion resistance. In various embodiments, these parts are made from a polymeric material known as polyoxymethylene (POM). Polymeric materials from the polyamide (such as NYLON by DUPONT) or acrylonitrile butadiene styrene (ABS) families may also be used in various embodiments. However, the disclosure of POM, polyamide, and ABS should not be considered limiting and other non-polymeric materials may be present in various embodiments.

In various embodiments, the non-illuminated marker 300 is an "ISO Marker Button," a variety of single-color and dual-color variations of which are available under the YKK® brand. In various embodiments, the markers—including illuminated markers 90—described herein meet the requirements of Federal Motor Vehicle Safety Standard ("FMVSS") 213 or FMVSS 225 or both.

Overmolding is one method of producing the button 310—or any other component shown formed from a moldable material—in such a way that the first portion 321 and the second portion 322 are formed in different colors. In a first step of an overmolding process—often employed using injection-molding equipment, the first portion 321 is molded using a material having a first color. In a second step of the overmolding process, the second portion 322 is molded in a second color over the first portion 321. After such an overmolding process is complete, both the first portion 321 and the second portion 322 are visible on the outer surface 320 and together highlight the desired graphical element. In various embodiments, a part can be molded so that the first portion 321 has a glossy finish and the second portion 322 has a matte finish by varying the finish on the various surfaces of the mold corresponding to the first portion 321 and the second portion 322.

In the current embodiment, the washer 340 of the non-illuminated marker 300 includes a hub 370, a rim 380, and plurality of ribs 390 that extend from the hub 370 to the rim 380. In various embodiments, the hub 370 defines a bore 350 sized to receive the aforementioned post (not shown) of the button 310. In various embodiments, the hub 370 defines a conical surface 371 and includes one or more anti-rotation features 360. The disclosure of anti-rotation features 360 on the hub 370 should not be considered limiting. The anti-rotation features 360 may be included in another area of the washer 340 separate from the hub 370, may be defined in the inner surface of the button 310, or may be defined in the surface of the vehicle in which the non-illuminated marker 300 is installed. In various embodiments, anti-rotation features 360 help ensure that the pictogram, logo, graphics, or text defined in the non-illuminated marker 300 and the illuminated markers 90 disclosed herein, where necessary, are maintained upright so as to be clearly understood and to meet other aesthetic and functional requirements.

FIG. 4 discloses one embodiment of an illuminated marker 400 using an electrically powered light source 510. In the current embodiment, the illuminated marker 400 includes a button 410, a washer 450, and the light source 510. In various embodiments, the button 410 defines an inner surface facing the washer 450 and an outer surface 420. The button 410 further includes a rim 430, an edge treatment 435, and a post 440 (shown in FIG. 5). The outer surface 420 of the button 410 includes a first portion 421 and a second portion 422. In various embodiments, the first portion 421 highlights a specific pictogram, logo, symbol, text, or other graphical element by being formed from a translucent material that transmits light from the light source 510 when the light source 510 is positioned facing the post or inner surface of the button 410. In various embodiments, the translucent material utilized is a natural (i.e. non-pigmented) grade of a polymeric material such as the aforementioned POM, described in at least some formulations as an acetal resin. While the material POM has a number of desirable properties including high stiffness, low friction, and dimensional stability, the disclosure of POM should not be considered limiting. In various embodiments, the translucent material is not transparent but only translucent but in other embodiments may be transparent.

In the current embodiment, the washer 450 of the illuminated marker 400 includes some of the same features of the washer 340 of the non-illuminated marker 300 including the hub 370, the rim 380, and the plurality of ribs 390 that extend from the hub 370 to the rim 380. The washer 450 is also shown with an outer surface 452. In various embodiments, the hub 370 defines a bore 350 sized to receive the post 440 of the button 410. In various embodiments, the hub 370 defines the conical surface 371 and includes one or more anti-rotation features 360. The disclosure of anti-rotation features 360 on the hub 370 should not be considered limiting. The anti-rotation features 360 may be included in another area of the washer separate from the hub 370 or may be included in the inner surface of the button 310. In various embodiments, the washer 450 includes a light mount 460 for receiving the light source 510.

In the current embodiment, the light source 510 includes a housing 520, a light generator 505, and one or more wires 590. The housing 520 includes a flange 530 and a plurality of snap levers 540. In various embodiments, the light source includes a light-emitting diode (LED). The disclosure of an illuminated marker 400 with an electrically powered LED light source, however, should not be considered limiting. In various embodiments, the illuminated marker 400 includes a light source that is not powered by electricity or does not include an LED light. In various embodiments, the illuminated marker 400 may include a light source that emits light through other forms of luminescence or may even utilize light traveling from a remote location in the vehicle user fiber optic wires. In the various embodiments disclosed herein, the material forming the washer 450 and the housing 520 is one of the same polymeric materials used to form the button 410. However, the disclosure of a polymeric material should not be considered limiting. In various embodiments, one or more of the various elements of the button 410, the washer 450, or the light source 510 may be formed from a metallic material or other non-polymeric material.

Figure 5:
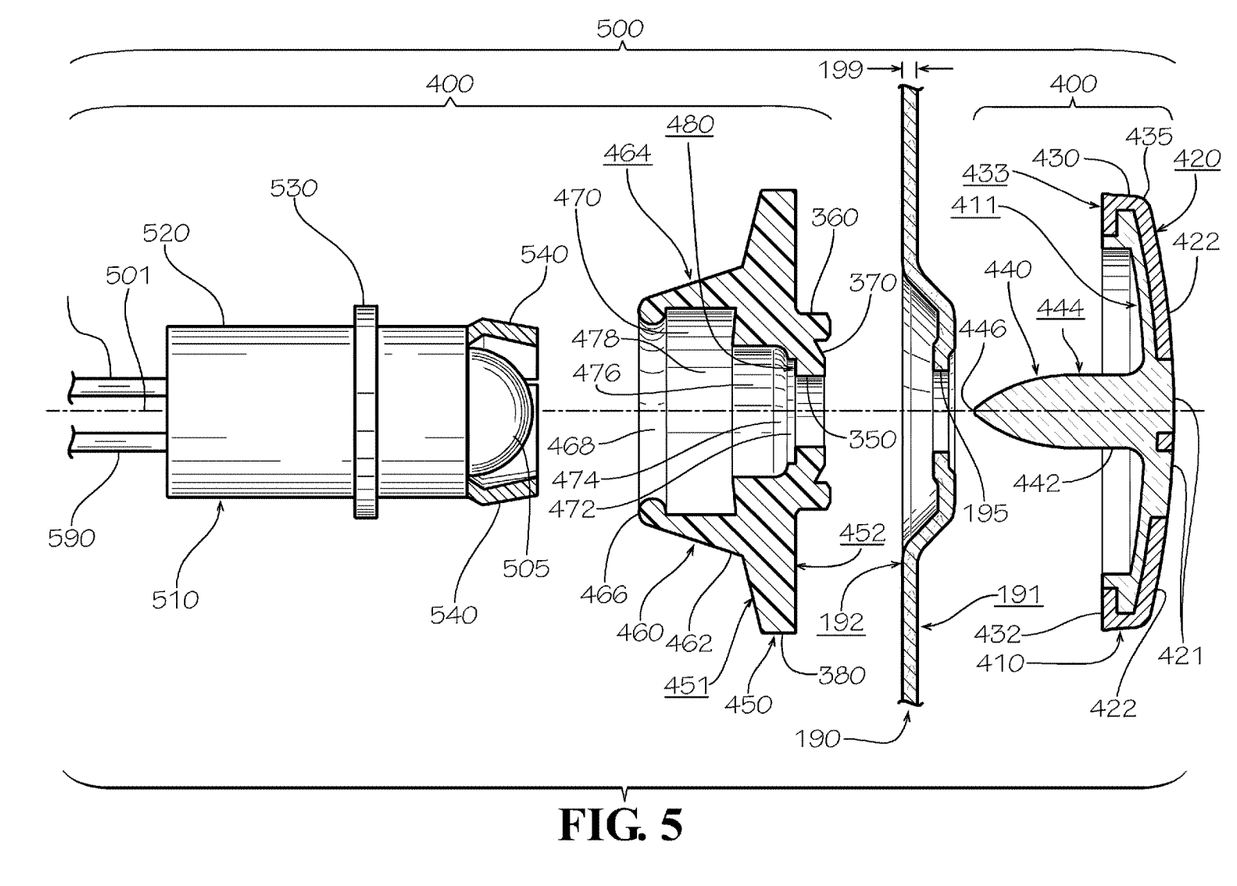
FIG. 5 is an exploded sectional view of an illuminated marker installation including the illuminated marker of FIG. 4 together with a fabric panel in which the illuminated marker is installed, taken along line 5-5 in FIG. 2.

FIG. 5 discloses an illuminated marker installation 500 before assembly including the illuminated marker 400 and a fabric panel 190. The button 410 is shown including the inner surface 411, the outer surface 420, and the post 440. The outer surface 420 includes the first portion 421 and the second portion 422, both the first portion 421 and the second portion 422 having a thickness extending below the outer surface 420 of the button 410. The button 410 includes the rim 430 and edge treatment 435. In various embodiments, the second portion 422 of the button 410 includes an annular return flange 432 that extends radially inwards from the rim 430 of the button 410. In various embodiments, the post 440 is formed integrally with the first portion 421, the first portion 421 extending from the outer surface 420 to the distal end 446 of the post 440.

In various embodiments, the post 440—shown in FIG. 5 in a non-deformed state—defines a post surface 444 and includes a base 442 and a distal end 446. In various embodiments, the post 440 tapers to point at the distal end 446 and the post surface 444 substantially resembles the shape of an elliptic paraboloid, though other shapes may be present in various embodiments. In various embodiments, the tip of the post 440 at the distal end 446 and the post surface 444 facilitate the insertion and assembly of the post 440 of the button 410 and its variants through the fabric panel 190, which could be made from any one of a number of different materials having different mechanical properties, and into the washer 450. In various embodiments, a post such as the post 440 lies orthogonal to or is orthogonal to (i.e., is at an angle of substantially 90 degrees to) an inner surface such as the inner surface 411 of the button 410.

Figure 6:
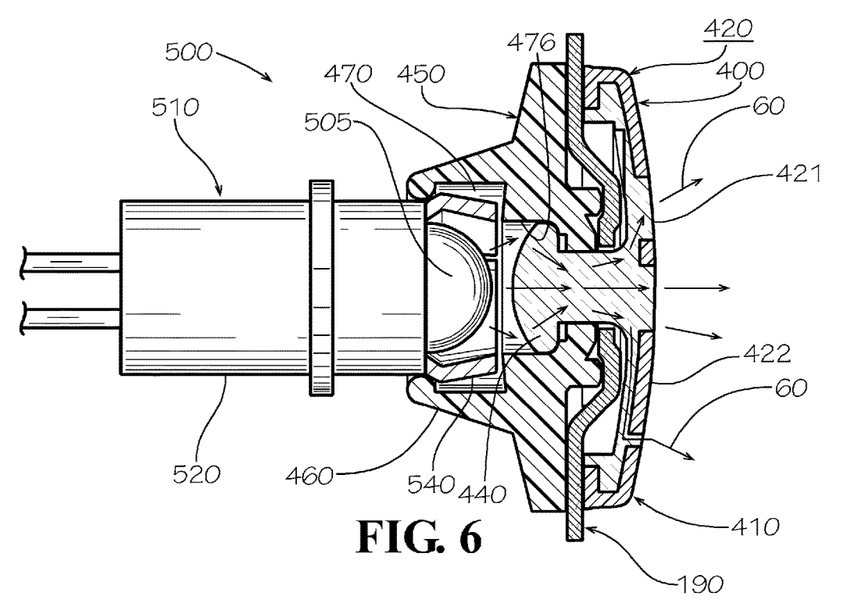
FIG. 6 is a sectional view of the illuminated marker of FIG. 4 installed in the fabric panel, taken along line 5-5 in FIG. 2.

The fabric panel 190 defines an outer surface 191, an inner surface 192, and an assembly hole 195 for installation of the non-illuminated marker 300 or the illuminated marker 400 or any one of the other illuminated markers 90 disclosed herein. In the current embodiment, the diameter of assembly hole 195 in the fabric panel 190 is sized to receive the post 440 of the button 410. A thickness 199 of the fabric panel 190 may vary without affecting the installation and proper operation of the non-illuminated marker 300 and the illuminated marker 400 because the post 440 can be deformed (as shown in FIG. 6) to different degrees during installation and still secure the fabric panel 190 between the button 410 and the washer 450.

The disclosure of illuminated marker 400 assembled to fabric panel 190 should not be considered limiting. Illuminated marker 400 and the other illuminated markers 90 disclosed herein could be installed on any one or more of a number of surfaces in the interior 100 of the vehicle. The surface in which the illuminated marker 90 is installed can be any one or more of a number of different materials including, but not limited to, flexible materials such as fabric, leather, vinyl and other flexible polymeric materials and more rigid materials such as metal, carbon-fiber, and acrylonitrile butadiene styrene (ABS) and other rigid polymeric materials. In FIG. 5, the fabric panel 190 is shown in a shape complementary to the outer surface 452 of the washer 450 and the inner surface 411 of button 410. In various other embodiments, before assembly of the components of an illuminated marker 90 such as the illuminated marker 400 shown in FIG. 5, the fabric panel 190 or vehicle surface to which the illuminated marker 90 is attached is flat or otherwise formed differently than shown.

FIG. 5 also discloses washer 450 as defining an inner surface 451 and the outer surface 452 and including the light mount 460 connected to the inner surface 451. In various embodiments, the light mount 460 defines an outer surface 464 and includes a base 462 and a distal end 466. In various embodiments, the shape of the distal end 466 is bulbous or rounded in order to ease entry of the snap levers 540 of the housing 520 of the light source 510, though other shapes may be present in various embodiments. In the current embodiment, the washer 450 defines a cavity 470 on an interior of the light mount 460. In various embodiments, the cavity 470 includes a shoulder portion 472, a transition portion 474, a post receiver portion 476, an intermediate portion 478 that is cylindrically shaped, and a distal portion 468. At the interface between the shoulder portion 472 of the cavity 470 and the bore 350 is a shoulder surface 480.

The light source 510 is shown in a partial sectional view with only snap levers 540 in cross-section in order to show the light generator 505. In various embodiments, an axis of the button 410, an axis of the washer 450, and an axis of the light source 510 are aligned along a central axis 501. In various embodiments, the axes of each of the components of the illuminated marker 400 need not align along a central axis. In various embodiments, the flange 530 serves as a gripping point on the housing 520 of the light source 510 in order to facilitate either manual or automated insertion or removal of the light source 510 with respect to the washer 450. In various other embodiments, a gripping ring is not included.

In various embodiments, wires 590 connect the light source 510 to a power source (not shown) positioned elsewhere in the vehicle—for example, a battery or alternator. The illuminated markers 90 such as the illuminated marker 400 may be wired to the power source and controlled to run continuously or only when a door has been opened. In some embodiments, a delay may be incorporated in the operation of the light source 510 of the illuminated marker 90 so that it remains on for a certain amount of time after the triggering event (the opening of a door, for example) has occurred. In various embodiments, this operation of the illuminated marker 400 would be similar to that of an interior ceiling lamp in some vehicles.

The wires 590 may additionally be part of a larger electrical circuit including printed circuit boards (not shown), fuses (not shown) or a variety of sensors (not shown) or switches (also not shown) for controlling the illuminated markers 90 to activate or deactivate under some predetermined set of conditions. Sensors that may be used in the circuit to additionally control—or provide input to the printed circuit board or other controls to additionally control—one or more of the illuminated markers 90 include, but are not limited to, light sensors, motion sensors, pressure sensors, and temperature sensors. Switches that may be used in the circuit to additionally control—or provide input to the printed circuit board or other controls to additionally control—one or more of the illuminated markers 90 include, but are not limited to, automatic door switches, manual light switches, and one or more of a variety of control knobs on the dashboard of the vehicle or on another surface in the vehicle. In the case that features are paired—for example, two or even three pairs of two anchors 210 each in a rear seat setup inside a vehicle, pairs of illuminated markers 90 can be controlled to operate together. In various embodiments, each pair of illuminated markers 90 or an entire set of illuminated markers 90 associated with the installation of a child safety seat in a particular location including any tether attachment points in the ceiling or floor of the vehicle can be controlled to all light up simultaneously (and only the illuminated markers 90 associated with the installation of a child safety seat in this particular location). In this way, a user can easily understand not only the location of individual features or portions of the safety system but how they function together as a whole.

FIG. 6 discloses the illuminated marker 400 installed in the fabric panel 190 in its assembled state as part of the assembled state of the illuminated marker installation 500. In various embodiments, the post 440 is mechanically deformable from a non-deformed state to a deformed state, the post 440 remaining sufficiently translucent to transmit light to the outer surface in the deformed state. In FIG. 6, the post 440 is shown in its deformed state after assembly. The material in the non-deformed post 440 is shown permanently deformed into a mushroom-shaped cross-section that fills a portion of the cavity 470 of washer 450 in such a way that the button 410 and the washer 450 are permanently secured to one another such that the button 410 cannot be removed from the washer 450 without further deforming or breaking the post 440, thereby also holding the illuminated marker 400 in place in the fabric panel 190 in the current embodiment. The deformation of the post 440 from the non-deformed state to the deformed state is facilitated by the use of a tool in various embodiments—operated manually or through automatic means—that effectively functions like a rivet gun to apply a compressive force to "upset" or deform the "tail" or post of the rivet (or button/washer assembly).

In various embodiments, a compressive force applied to the outer surface 420 of the button 410 of the illuminated marker 400 and to a surface opposite the outer surface 420 of the button 410 of the illuminated marker 400 joins the button 410 to the fabric panel 190 or another surface of the vehicle for mounting the illuminated marker 400. In various embodiments, a compressive force is applied to the outer surface 420 and to the distal end 446 of the post 440, causing the post 440 to fixably engage the washer. In various embodiments, installing the illuminated marker 400 includes plastically (i.e. permanently) deforming the post 440 of the button 410 inside the cavity 476, the outer surface 420 of the illuminated marker 400 and the washer 450 of the illuminated marker 400 thereby locked in position on opposite sides of the surface of the vehicle.

Snap levers 540 are shown captive inside the cavity 470. The spaces or gaps between adjacent snap levers 540 (shown more clearly in FIG. 4) allow the snap levers 540 to bend at the base in order to clear the radially inward extending bulbous shape of the distal end 466 of the light mount 460. In various embodiments, the mechanical deformation of the post 440 may adversely affect the ability of the post to transmit light, even if only slightly, though in other embodiments the post 440 may remain translucent or transparent even after deformation. In order to increase or improve the translucence of the material in the post 440 after it has been deformed, heat, light, or chemicals may be applied to the post 440 after deformation of the post 440. Other to-be-described embodiments of an illuminated marker 90 do not require a post to be permanently deformed at all.

In the illuminated marker installation 500, the light generator 505 of the light source 510 emits light rays 60. The light rays 60 pass through the translucent material of the post 440 and towards the outer surface 420 until they reach the outer surface 420. Where the first portion 421 is exposed at the outer surface 420, light rays 60 exit the illuminated marker 400. In various embodiments, the light rays 60 do not exit from the outer surface 420 at the second portion 422 because the material used to form the second portion 422 is opaque (i.e. not translucent). In various other embodiments, the light rays 60 do exit from the outer surface 420 at the second portion 422 because the material used to form the second portion 422 is translucent, but of a different degree of translucence or color or both than the first portion 421, thereby resulting in a similar effect of bringing attention to the graphics defined in the button 410.

Figure 7:
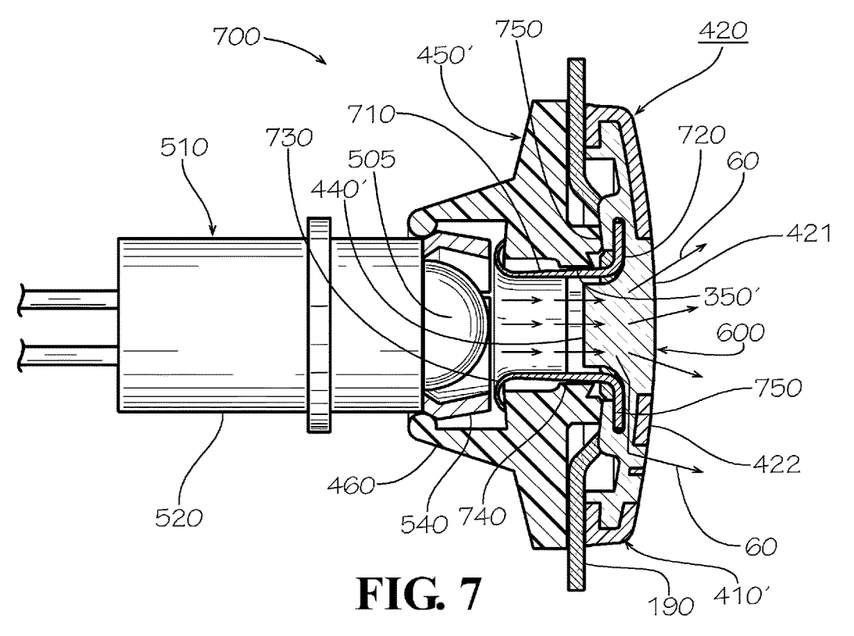
FIG. 7 is a sectional view of another embodiment of the illuminated marker of FIG. 4 installed in the fabric panel, taken along line 5-5 in FIG. 2.

FIG. 7 discloses a post-assembly illuminated marker installation 700 including illuminated marker 600 in its deformed state. The illuminated marker 600 varies from the illuminated marker 400 in that a separate post 740—formed from metal into a hollow cylindrical shape in the current embodiment—is assembled to a button 410' before the button 410' is assembled to a washer 450'. The washer 450' itself varies from the washer 450 in that the washer 450' defines a larger bore 350' in some embodiments in order to accommodate the post 740 having a greater diameter than the post 440, though the post 740 may have a smaller diameter in various embodiments. The button 410' still includes a post 440' formed in a translucent material as part of the first portion 421. However, the height of the post 440' from the base to the distal end is less than that of the post 440 because post 440' is effectively a truncated variation of the post 440. In the current embodiments, the post 740 is shown in its deformed state. In various embodiments, the post 740 includes a base flange 720, a body 710, and a distal end 730. The base flange 720 of the post 740 may be held in place by one or more keepers 750. In various embodiments, the post 740 is formed from a brass alloy material. The disclosure of a brass alloy material, however, should not be considered limiting, and other metallic or non-metallic materials may be present in various embodiments.

In the illuminated marker installation 700, the light generator 505 of the light source 510 emits light rays 60. The light rays 60 pass through the hollow center of the post 740 and then through the translucent material of the post 440' and towards the outer surface 420 until they reach the outer surface 420. Where the first portion 421 is exposed at the outer surface 420, the light rays 60 exit the illuminated marker 600. In various embodiments, the light rays 60 do not exit from the outer surface 420 at the second portion 422 because the material used to form the second portion 422 is opaque (i.e. not translucent). In various other embodiments, the light rays 60 do exit from the outer surface 420 at the second portion 422 because the material used to form the second portion 422 is translucent, but of a different degree of translucence or color or both than the first portion 421, thereby resulting in a similar effect of bringing attention to the graphics defined in the button 410.

Figure 8:
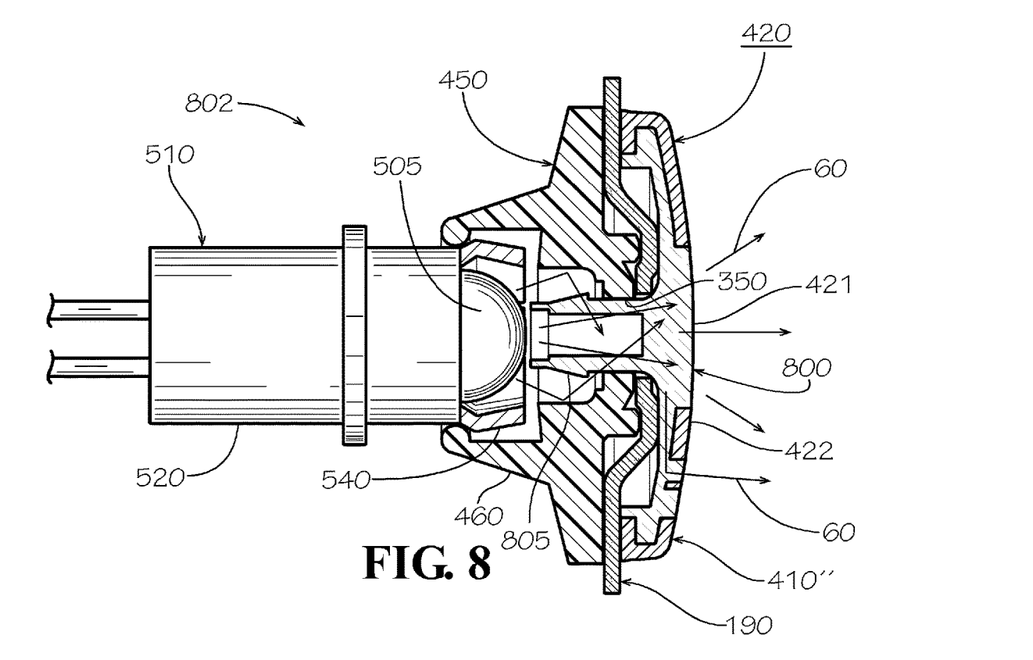
FIG. 8 is a sectional view of another embodiment of the illuminated marker of FIG. 4 installed in the fabric panel, taken along line 5-5 in FIG. 2.

FIG. 8 discloses an illuminated marker installation 802 including an illuminated marker 800. The illuminated marker 800 includes a button 410", the button 410" including a hollow, dart-shaped post 805—described in more detail in the succeeding paragraphs—that slides and then snaps into the bore 350 defined in the hub 370. In the illuminated marker installation 802, the light generator 505 of the light source 510 emits light rays 60. The light rays 60 pass through the hollow center and through the translucent material of the post 805 and then through the translucent material of the first portion 421 of the button. The light rays 60 reaching the outer surface 420 where the first portion 421 is exposed exit the illuminated marker 800. In various embodiments, the light rays 60 do not exit from the outer surface 420 at the second portion 422 because the material used to form the second portion 422 is opaque (i.e. not translucent). In various other embodiments, the light rays 60 do exit from the outer surface 420 at the second portion 422 because the material used to form the second portion 422 is translucent, but of a different degree of translucence or color or both than the first portion 421, thereby resulting in a similar effect of bringing attention to the graphics defined in the button 410.

Figure 9:
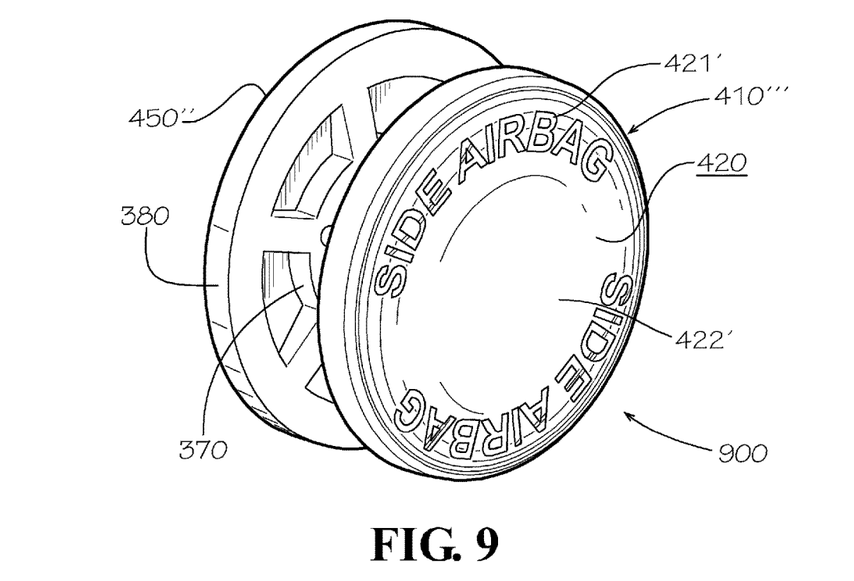
FIG. 9 is a perspective view of another embodiment of an illuminated marker that includes a photoluminescent material.

FIG. 9 is a perspective view of an illuminated marker 900 that includes a photoluminescent material capable of emitting light and is marked with graphics that communicate the existence of a particular safety feature in the vehicle—in this case, a side airbag. More specifically, a photoluminescent material—particularly, in various embodiments, a phosphorescent material, itself a photoluminescent material—that is activated or "charged" by ultraviolet (UV) radiation—is capable of emitting light as a result of being previously "charged" by exposure to UV radiation, which is present in natural sunlight and some other light sources. In various embodiments, a phosphorescent material does not immediately emit (or re-emit) the radiation it absorbs. Fluorescence, another type of photoluminescence, will tend to re-emit absorbed radiation immediately. To a limit depending on the photoluminescent material being used and the degree of exposure, increased exposure to UV radiation generally increases the "charge" and therefore the amount of time that the photoluminescent material can emit light once the ambient UV light source is removed. No separate light source is typically required aside from the light required to charge the photoluminescent material, some embodiments of which are sometimes colloquially referred to as being "glow-in-the-dark." The illuminated marker 900, which can also be referred to as a photoluminescent marker, includes a button 410'" and a washer 450". In various embodiments, washer 450" includes a hub 370 and a rim 380 and resembles washer 340. In various embodiments, the light mount 460 is not present because no light source requires mounting. In various embodiments, however, a light source can be used in combination with a photoluminescent material and in such embodiments a light mount such as the light source 460 may be included in the structure of the washer 450".

The button 410'" includes a first portion 421' formed from the photoluminescent material and defining graphics exposed at the outer surface 420. In various embodiments, the button 410'" may be attached to the washer 450" using post configurations similar to the post configurations in the other embodiments of illuminated markers 90. The button 410'" also includes a second portion 422' formed from a material that is not photoluminescent. Even if the amount of light emitted from the "charged" photoluminescent material is relatively low, the contrast between the photoluminescent material of the first portion 421' and the opaque or otherwise non-photoluminescent material of the second portion 422' allows a user to perceive the graphics on the button 410'", especially in low light or no-light conditions where the illuminated graphics message will be most visible.

Figure 10:
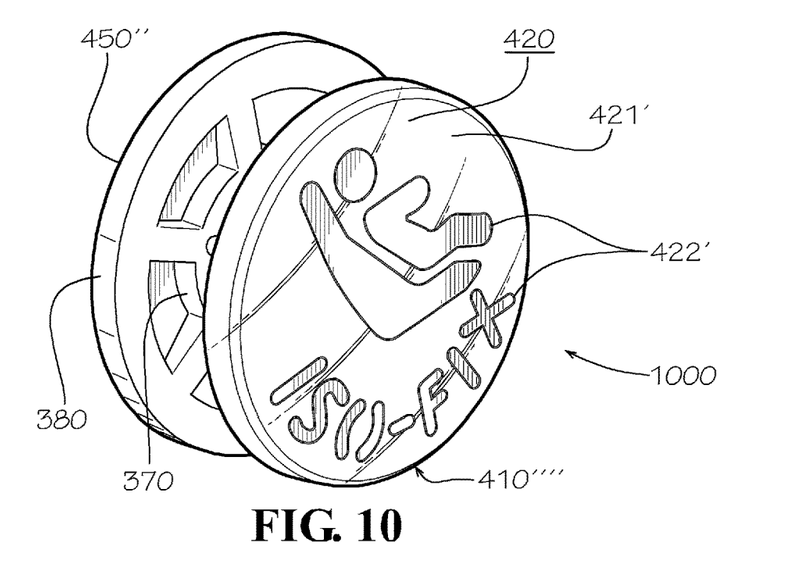
FIG. 10 is a perspective view of another embodiment of an illuminated marker similar to the marker shown in FIG. 9.

FIG. 10 discloses an illuminated marker 1000, which is similar to that shown in FIG. 9 but includes the ISOFIX logo and the "ISO-FIX" text. The illuminated marker 1000, which can also be referred to as a photoluminescent marker, includes a button 410"" and the washer 450". The button 410"" includes a first portion 421' formed from the photoluminescent material and defining a background exposed at the outer surface 420. The button 410'" also includes a second portion 422' formed from a material that is not photoluminescent and defining graphics, which is this case is the aforementioned ISOFIX logo and text. Even if the amount of light emitted from the "charged" photoluminescent material is relatively low, the contrast between the photoluminescent material of the first portion 421' and the opaque or otherwise non-photoluminescent material of the second portion 422' allows a user to perceive the graphics on the button 410"", especially in low light or no-light conditions where the illuminated graphics message will be most visible. In various embodiments of illuminated markers 90 including a photoluminescent material, the post 805 can be made out of either a translucent material or a non-translucent material because the post 805 need not transmit light from a light source to the outer surface.

Figure 11:
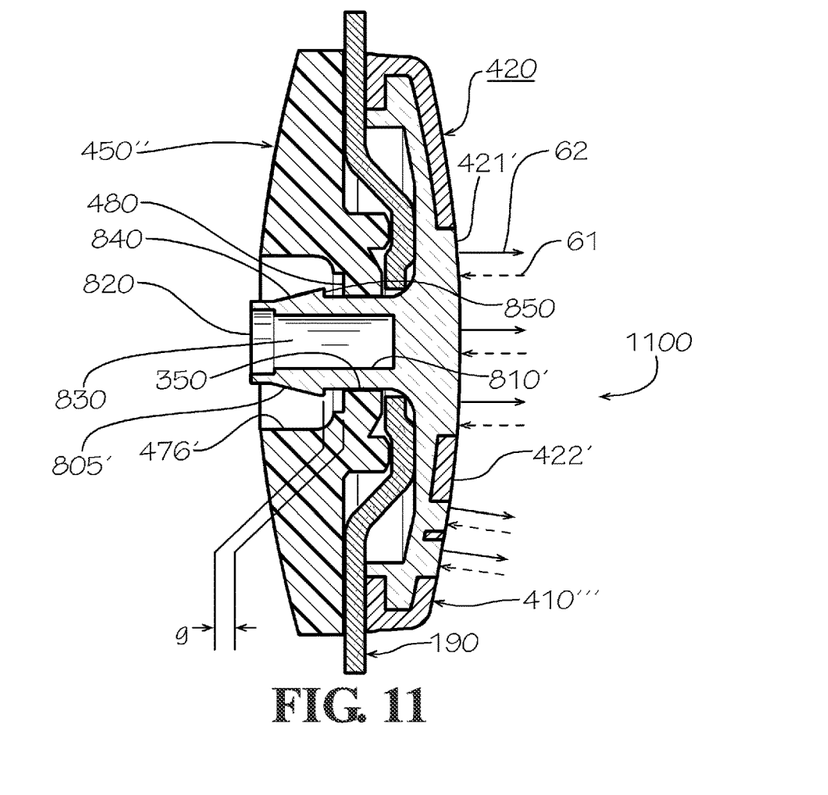
FIG. 11 is a sectional view of another embodiment of an illuminated marker including a photoluminescent material, taken along line 5-5 in FIG. 2.

FIG. 11 discloses a sectional detail view of an illuminated marker 1100, which emits light from a first portion 421' formed from a photoluminescent material. In various embodiments, a second portion 422' is formed from a material that is not photoluminescent. The illuminated marker 1100 includes the button 410'" and the washer 450". The button 410'" includes an inner surface (not shown) and an outer surface 420. In various embodiments, the illuminated marker 1100 also includes the aforementioned post 805'. The post 805' includes a base 810', a distal end 820, a cavity 830, one or more barbs defining a snap-fit connection 840, and a stop surface 850. In addition, the washer 450" includes a shoulder surface 480 and defines a cavity 476' and a bore 350, each of the shoulder surface 480, the cavity 476', and the bore 350 having a size and shape to allow snap-fit engagement of the snap-fit connection 840 of the post 805' but also having a size and shape to also prevent disengagement of the snap-fit connection 840. In various embodiments, the stop surface 850 contacts the shoulder surface 480 to prevent disengagement of the snap-fit connection 840. In various embodiments, the cavity 476' is sized to not only allow penetration and engagement of the post 805' in the washer 450" but also to allow a tool such as a set of pliers (not shown) to forcibly manipulate the post 805' so that the button 450'" including the post 805' can be removed and replaced during the manufacturing process or during servicing. The disclosure of specific benefits for the shape of the cavity 476', however, should not be considered limiting on the current disclosure. In various embodiments, replacement of an illuminated marker such as the illuminated marker 1100 is facilitated by drilling through the center of the post 805' with a boring device (not shown) having an outer diameter approximately equal to an inner diameter of the bore 350. In the current embodiment, a gap g exists between the shoulder surface 480 of the washer 450" and stop surface 850 of the post 805' of the button 410'''. In various embodiments, the gap g will equal zero or substantially zero so as to guarantee a clamping force between the button 410''' and the washer 450" with the fabric panel 190 secured in between. In actual use, light rays 61 from an ambient light source—and specifically UV light or UV radiation from a UV light source in the case of a UV-activated photoluminescent material—"charge" the photoluminescent material forming the first portion 421' of the outer surface 420. Once the ambient light source is removed, light rays 62 are continuously emitted from the photoluminescent material forming the first portion 421' of the outer surface 420 until the photoluminescent material loses its "charge." Depending on the photoluminescent material used, the duration of exposure to light rays 61, and other factors, the photoluminescent material may emit light rays 62 for several minutes or several hours.

In various embodiments, the photoluminescent material will be applied to the outer surface of a button or only at the outer surface of a button. In various embodiments, both the non-illuminated markers 300 and the illuminated markers 90 described herein will be assembled to the fabric panel 190 or other vehicle surface before those panels are sewn to form a seat cover or otherwise assembled to the interior 100 of the vehicle.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The size, shape thickness, and other dimensions and features of the various components shown in the figures are for illustrative purposes and should not be considered limiting. The drawings are not necessarily drawn to scale.

That which is claimed is:

1. An illuminated marker comprising:
   a button comprising
      an inner surface;
      an outer surface, the outer surface including a first portion and a second portion, the first portion being translucent; and
      a post, the post extending from the inner surface away from the outer surface; and
   a washer, the washer defining a bore sized to receive the post of the button, the washer comprising a light mount, the washer formed as a single piece including the light mount, the light mount defining a cavity configured to receive a light source therein, wherein light from the light source is transmitted through the post, the cavity comprising a post receiver portion for the post to fixably engage the washer, wherein a diameter of a portion of the post engaged within the post receiver portion is greater than a diameter of the bore of the washer after engagement.

2. The marker of claim 1, wherein the post is formed integrally with the first portion, the first portion extending from the outer surface to a distal end of the post.

3. The marker of claim 2, wherein the post is mechanically deformable from a non-deformed state to a deformed state, the post remaining sufficiently translucent to transmit light to the outer surface in the deformed state.

4. The marker of claim 1, wherein the post includes a snap-fit connection.

5. The marker of claim 1, wherein a diameter of the bore is smaller than a diameter of the cavity of the light mount.

6. The marker of claim 5, wherein the distal end of the post is in a deformed condition inside the cavity.

7. The marker of claim 1, further comprising a light source, the light source including a housing and a light generator, the housing comprising snap levers.

8. The marker of claim 7, wherein the light generator includes a light-emitting diode.

9. The marker of claim 1, wherein the distal end of the post is in a deformed condition inside the cavity.

10. A method of installing an illuminated marker on a vehicle, the method comprising:
    aligning a post of a button of the marker with a bore of a washer of the marker, the post extending from an inner surface of the marker and away from an outer surface of the marker, the washer defining an inner surface and an outer surface opposite from the inner surface, the inner surface of the washer defining a bore, the washer comprising a light mount extending from the outer surface of the washer, the washer formed as a single piece including the light mount, the light mount defining a cavity configured to receive a light source therein, wherein light from the light source is transmitted through the post, a diameter of the bore being smaller than a diameter of the cavity;
    inserting the post into an assembly hole defined in a surface of the vehicle to mount the marker on the surface of the vehicle, the surface of the vehicle positioned between the washer and the inner surface of the button of the marker, the washer contacting the vehicle;
    inserting the post into and through the bore of the washer;

deforming a distal end of the post inside the cavity of the washer; and securing the post to the washer by expanding a diameter of the distal end of the post inside a post receiver portion defined in the cavity of the washer.

11. The method of claim 10, further comprising attaching a light source to the washer by snapping a housing of the light source into the cavity defined in a light mount of the washer, the light source including a light-emitting diode.

12. The method of claim 10, further comprising emitting light from the marker.

13. The method of claim 10, wherein the vehicle comprises a panel that defines the assembly hole.

14. The method of claim 13, wherein the surface of the vehicle is defined by an interior of the vehicle, the assembly hole defined in a flexible material forming the surface of the vehicle.

15. The method of claim 13, further comprising applying a compressive force to the outer surface of the button of the marker and a surface opposite the outer surface of the button of the marker, with the surface of the vehicle in between, the post fixably engaging the washer.

16. The method of claim 13, further comprising plastically deforming the post of the button, the outer surface of the marker and the washer of the marker thereby locked in position on opposite sides of the surface of the vehicle.

17. The method of claim 10, wherein a diameter of the distal end of the post is greater than a diameter of the post after deformation of the distal end of the post inside the post receiver portion of the cavity.

18. The method of claim 10, wherein a diameter of the distal end of the post is greater than a diameter of the post proximate to the inner surface of the marker after deformation of the distal end of the post inside the post receiver portion of the cavity.

19. The marker of claim 10, wherein, in deforming a distal end of the post, the post remains sufficiently translucent to transmit light to the outer surface.

* * * * *